United States Patent
Watanabe (10) Patent No.: US 9,598,138 B2
(45) Date of Patent: Mar. 21, 2017

(54) STEERING STRUCTURE OF SADDLE-RIDE-TYPE VEHICLE

(71) Applicant: HONDA MOTOR CO., LTD., Tokyo (JP)

(72) Inventor: Akimi Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/638,576

(22) Filed: Mar. 4, 2015

(65) Prior Publication Data

US 2015/0251722 A1  Sep. 10, 2015

(30) Foreign Application Priority Data

Mar. 10, 2014 (JP) ................................. 2014-046673

(51) Int. Cl.
*B62K 21/08* (2006.01)
*B62K 21/18* (2006.01)

(52) U.S. Cl.
CPC ............. *B62K 21/08* (2013.01); *B62K 21/18* (2013.01)

(58) Field of Classification Search
CPC ........ B62K 21/08; B62K 21/18; B62K 19/30; B62K 11/06
USPC .......................... 280/271, 272, 89, 90, 89.13
See application file for complete search history.

(56) References Cited

U.S. PATENT DOCUMENTS

| | | | | |
|---|---|---|---|---|
| 7,306,248 B2 * | 12/2007 | Gogo et al. | ............. | F16F 9/064 280/272 |
| 8,439,380 B2 * | 5/2013 | Mori | ...................... | B62K 21/08 280/271 |
| 8,684,385 B2 * | 4/2014 | Kuboyama et al. | ... | B62K 21/08 280/271 |
| 2005/0151341 A1 * | 7/2005 | Iwamoto et al. | ...... | B62K 21/08 280/272 |
| 2005/0236791 A1 * | 10/2005 | Carr | ........................ | B62K 5/027 280/92 |
| 2006/0207845 A1 * | 9/2006 | Gogo et al. | ............ | B62K 21/08 188/290 |
| 2007/0095624 A1 * | 5/2007 | Ito | .......................... | B62K 21/08 188/314 |
| 2008/0054590 A1 * | 3/2008 | Mori et al. | ............. | B62K 21/08 280/272 |
| 2008/0303258 A1 * | 12/2008 | Kuo | ........................ | B62K 21/08 280/755 |
| 2011/0309598 A1 * | 12/2011 | Mori | ....................... | B62K 21/08 280/276 |

FOREIGN PATENT DOCUMENTS

| | | | | |
|---|---|---|---|---|
| CA | 2476975 | * | 2/2005 | ............ B62K 21/08 |
| JP | 2012-218586 A | | 11/2012 | |
| WO | 2012/149980 | * | 11/2012 | ............ B62K 21/08 |

* cited by examiner

*Primary Examiner* — Anne Marie Boehler
(74) *Attorney, Agent, or Firm* — Westerman, Hattori, Daniels & Adrian, LLP (57) ABSTRACT

A steering structure of a saddle-ride-type vehicle includes a steering shaft rotatably supported on a head pipe provided to a front end portion of a vehicle body frame, a bridge mounted on the steering shaft above or below the head pipe, and a cylinder type steering damper provided between the vehicle body frame and the bridge. The steering damper is mounted on the bridge in front of a center axis of the steering shaft as viewed in a side view, and on the vehicle body frame behind the center axis as viewed in a side view.

12 Claims, 7 Drawing Sheets

STEERING STRUCTURE OF SADDLE-RIDE-TYPE VEHICLE

FIELD OF THE INVENTION

The present invention relates to a steering structure of a saddle-ride-type vehicle where a steering shaft is rotatably supported on a head pipe provided to a front end portion of a vehicle body frame, a bridge is mounted on the steering shaft above or below the head pipe, and a cylinder type steering damper is provided between the vehicle body frame and the bridge.

BACKGROUND OF THE INVENTION

A known steering structure of a saddle-ride-type vehicle is shown in JP-A-2012-218586 ("JP '586").

SUMMARY OF THE INVENTION

When the cylinder type steering damper provided between the steering shaft and the vehicle body frame is arranged in front of the head pipe, it is necessary to ensure a space which is defined by taking twisting or the like into consideration between the steering damper and the head pipe and hence, the arrangement of the cylinder type steering damper may influence the design of the head pipe and an area around the head pipe. On the other hand, in the steering structure of a saddle-ride-type vehicle disclosed in JP '586, the steering damper is provided between a rear portion of the bottom bridge and a main frame extending rearwardly and downwardly from the head pipe and is arranged below the main frame. Although no restriction is imposed on the design of the head pipe and the area around the head pipe, it is necessary to secure a relatively large space for arranging a steering damper below the main frame.

The present invention has been made in view of the above-mentioned circumstances, and one object of the present invention to provide a steering structure of a saddle-ride-type vehicle which can realize space saving also on a vehicle body frame side while increasing the degree of freedom in designing a head pipe and an area around the head pipe.

To achieve the above-mentioned object, the first technical feature of the invention lies in a steering structure of a saddle-ride-type vehicle where a steering shaft is rotatably supported on a head pipe provided to a front end portion of a vehicle body frame, a bridge is mounted on the steering shaft above or below the head pipe, and a cylinder type steering damper is provided between the vehicle body frame and the bridge, wherein the steering damper is mounted on the bridge in front of a center axis of the steering shaft as viewed in a side view, and is mounted on the vehicle body frame behind the center axis as viewed in a side view.

Accordingly, the steering damper does not influence the design of the head pipe and the area around the head pipe and hence, the degree of freedom in design can be enhanced whereby space saving can be realized also on a vehicle body frame side.

The second technical feature of the invention lies in that, in addition to the constitution of the first technical feature, the bridge is a bottom bridge mounted on the steering shaft below the head pipe, and the steering damper is arranged below the bottom bridge.

Accordingly, the steering damper can be arranged by effectively making use of a vacant space between the bottom bridge and the front wheel and hence, the degree of freedom in designing the head pipe and the area around the head pipe can be further enhanced.

The third technical feature of the invention lies in that, in addition to the constitution of the first or second technical feature, a cover which covers the steering damper from below is arranged between the steering damper and a front wheel.

Accordingly, the steering damper can be protected from mud, water and dust or the like splashed up from the front wheel.

The fourth technical feature of the invention lies in that, in addition to the constitution of any one of the first to third technical features, an attenuation force of the steering damper which is generated at the time of steering is set smaller than the attenuation force generated at the time of returning the steering to a neutral position, and a coil spring compressed at the time of steering is housed in the steering damper.

Accordingly, the feel of steering can be enhanced, and a spring force of a coil spring is applied at the time of returning the steering to a neutral position and hence, a load imposed on a rider can be reduced.

The fifth technical feature of the invention lies in that, in addition to the constitution of any one of the first to fourth technical features, the steering damper includes: a damper case including first and second bottomed slide holes and being mounted on either one of the bridge and the vehicle body frame; a first piston defining a damper chamber between the damper case and the first piston and being slidably fitted into the first slide hole; a damper rod having one end portion thereof fixed to the first piston and the other end thereof fixed to the other of the bridge and the vehicle body frame; a second piston defining a reservoir chamber communicated with the damper chamber between the damper case and the second piston and being slidably fitted into the second slide hole; a coil spring housed in the damper chamber such that the coil spring biases the first piston toward a side where a volume of the damper chamber is increased; and a return spring which biases the second piston toward a side where a volume of the reservoir chamber is decreased, wherein the steering damper is provided between the bridge and the vehicle body frame such that the first piston is moved toward a side where the volume of the damper chamber is decreased so as to compress the coil spring in a steering state while maximally increasing a length of the steering damper in a non-steering state.

Accordingly, a steering torque can be changed in a progressive manner, and when the steering damper returns to the neutral position from a steering position, a spring force of the coil spring and a spring force of the return spring act toward a side where the first piston is returned and hence, the steering damper can be returned to the neutral position without giving a feeling of discomfort to a rider.

The sixth technical feature of the invention lies in, in addition to the constitution of any one of the first to third technical features, that the steering damper includes: a damper case including first and second bottomed slide holes and being mounted on either one of the bridge and the vehicle body frame; a first piston defining a damper chamber between the damper case and the first piston and being slidably fitted into the first slide hole; a damper rod having one end portion thereof fixed to the first piston and the other end thereof fixed to the other of the bridge and the vehicle body frame; and a second piston slidably fitted into the second slide hole in a state where both ends of the second piston face a reservoir chamber which is formed in the damper case in a communicating manner with the damper chamber and a pressurized air chamber formed in the damper case into which pressurized air is filled respectively, wherein the steering damper is provided between the bridge and the vehicle body frame such that the first piston is moved toward a side where the volume of the damper chamber is decreased in a steering state while maximally increasing a length of the steering damper in a non-steering state.

Accordingly, it is possible to impart a steering reaction force to the steering damper, and it is also possible to change such a reaction force.

BRIEF DESCRIPTION OF THE DRAWINGS

The present invention will be described with reference to the accompanying drawings, wherein.

DETAILED DESCRIPTION OF THE INVENTION

Embodiments of the invention are explained by reference to the aforementioned drawings. In the explanation made hereinafter, the directions such as frontward, rearward, leftward, rightward, upward and downward are directions as viewed from a rider who rides on a motorcycle.

Figure 1:
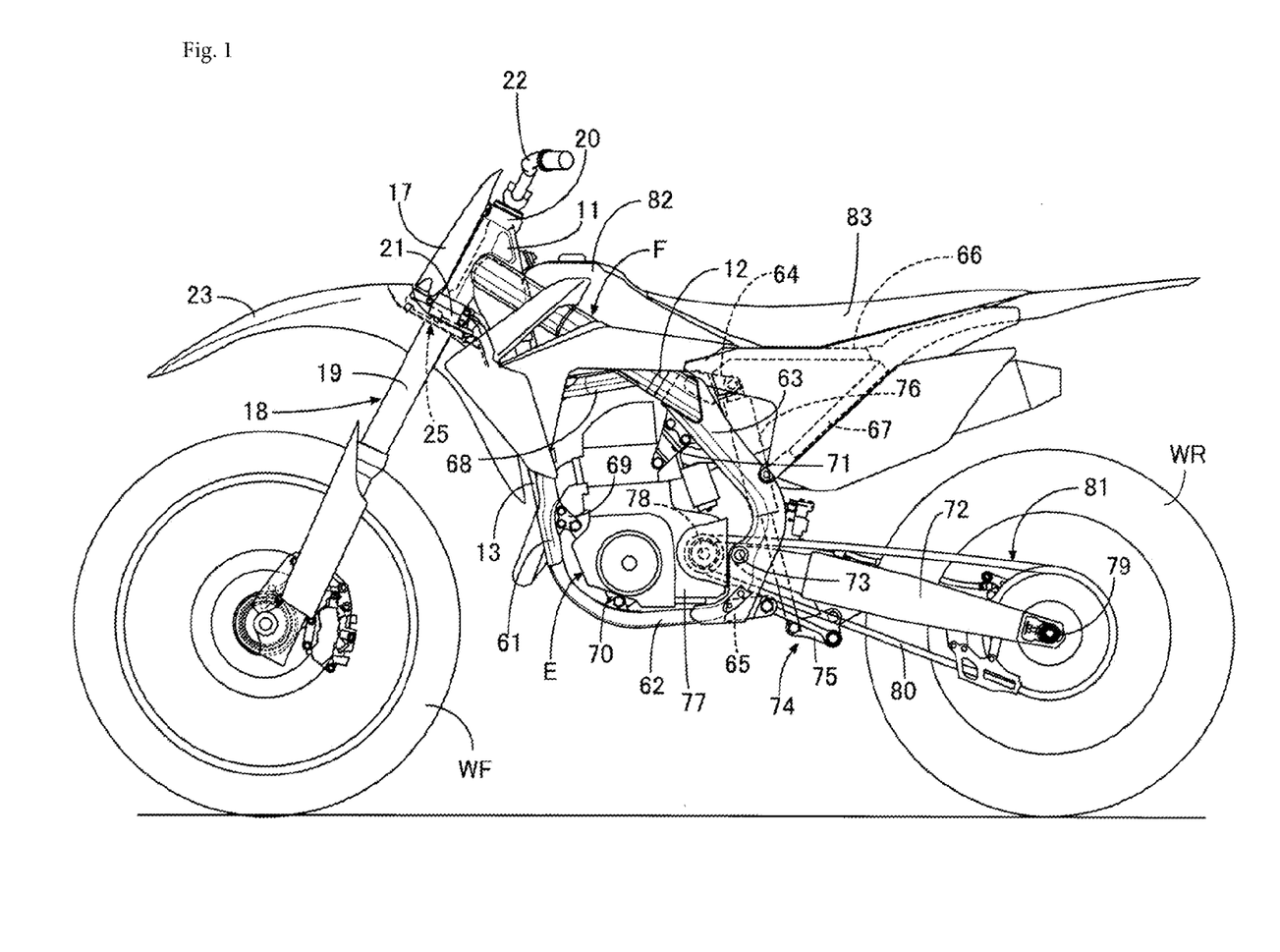
FIG. 1 is a left side view of a motorcycle of a first embodiment.
Figure 2:
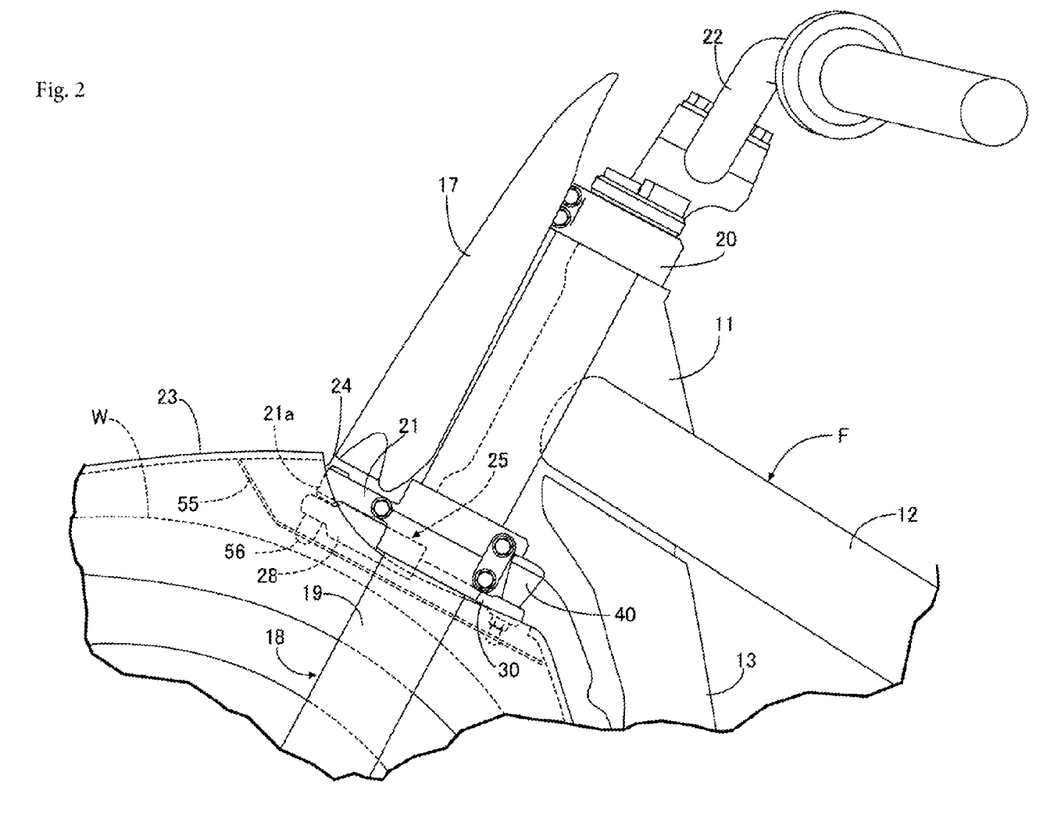
FIG. 2 is a side view of a front portion of the motorcycle.

A first embodiment of the invention is explained by reference to FIG. 1 to FIG. 6. First, as shown in FIG. 1 and FIG. 2, a vehicle body frame F of a motorcycle includes: a head pipe 11 which supports a front fork 18 pivotally supporting a front wheel WF and a bar-shaped steering handle 22 in a steerable manner; a pair of left and right main frames 12 which extends rearwardly and downwardly from the head pipe 11; down frames 13 which extend rearwardly and downwardly from the head pipe 11 at a steeper angle than the main frames 12; a pair of left and right lower frames 62 which is respectively continuously joined to lower end portions of the down frames 13 by way of joints 61 and extend rearwardly; a pair of left and right pivot plates 63 which has upper end portions thereof joined to rear end portions of the main frames 12, extends downwardly, and has lower end portions to which rear end portions of both lower frames 62 are connected; an upper cross member 64 which is provided in an extending manner between upper end portions of these pivot plates 63; a lower cross member 65 which is provided in an extending manner between lower end portions of both pivot plates 63; a pair of left and right seat rails 66 which has front end portions thereof connected to the upper cross member 64 and extends rearwardly; a pair of left and right rear frames 67 which connects vertically intermediate portions of the pivot plates 63 and rear portions of both seat rails 66; and an approximately U shaped reinforcing frame 68 which connects lower portions of the down frames 13 and both main frames 12 to each other.

The pivot plates 63 are configured to extend in the vertical direction with vertically intermediated portions thereof bent in a rearwardly projecting manner. Front portions of the rear frames 67 are connected to the vertically intermediate portions of the pivot plates 63.

An engine E is arranged in a space surrounded by the main frames 12, the down frames 13, the joints 61, the lower frames 62 and the pivot plates 63. A front portion of the engine E is supported by the joints 61 by way of first engine hangers 69. A lower portion of the engine E is supported by a second engine hanger 70 formed on the lower frames 62. An upper portion of the engine E is supported by upper portions of the pivot plates 63 by way of third engine hangers 71.

Front end portions of the swing arms 72 which pivotally support a rear wheel WR at rear end portions thereof are supported in a vertically swingable manner by lower portions of the pivot plates 63 by way of a support shaft 73. A link mechanism 74 is provided between the lower cross member 65 and the swing arms 72. A cushion unit 76 is provided between a link member 75 which constitutes a portion of the link mechanism 74 and the upper cross member 64.

A transmission not shown in the drawing is housed in the inside of a crankcase 77 which the engine E includes. An output shaft 78 of the transmission projects leftward from the crankcase 77. A power transmission means 81 which is formed of an endless chain 80 is provided between the output shaft 78 and an axle 79 of the rear wheel WR.

A fuel tank 82 is mounted on both main frames 12 above the engine E. A rider's seat 83 is arranged behind the fuel tank 82 in a state where the rider's seat 83 is supported by the seat rails 66.

Figure 3:
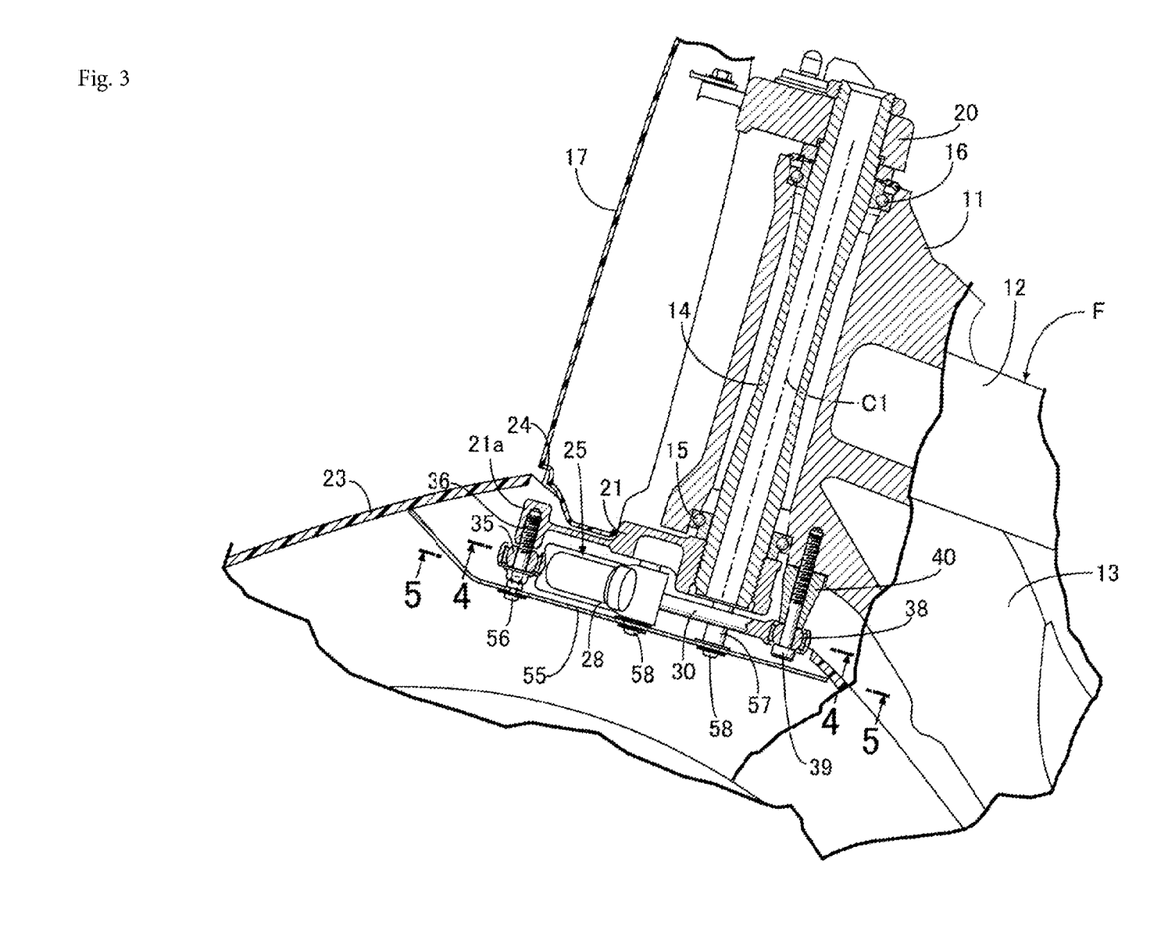
FIG. 3 is a longitudinal cross-sectional side view of the front portion of the motorcycle.

As shown in FIG. 3, a steering shaft 14 is made to pass through the head pipe 11. A ball bearing 15 is interposed between a lower end portion of the head pipe 11 and the steering shaft 14, and a ball bearing 16 is interposed between an upper end portion of the head pipe 11 and the steering shaft 14. A front cover 17 which covers the head pipe 11 from a front side is mounted on the head pipe 11.

The front wheel WF is pivotally supported on a lower portion of the front fork 18. The front fork 18 includes: fork pipes 19 which extend in the vertical direction on both left and right sides of the front wheel WF respectively; a top bridge 20 which is provided in an extending manner between upper end portions of these fork pipes 19; and a bottom bridge 21 which is provided in an extending manner between intermediate portions of the fork pipes 19 below the head pipe 11.

An upper end portion of the steering shaft 14 is fixed to a center portion of the top bridge 20, and the steering handle 22 is mounted on the top bridge 20. A lower end portion of the steering shaft 14 which projects downwardly from the head pipe 11 is fixed to a center portion of the bottom bridge 21. A front fender 23 which has an opening portion 24 on an upper end portion thereof for allowing the bottom bridge 21 to be arranged in the opening portion 24 is mounted on the bottom bridge 21 such that the front fender 23 covers the front wheel WF from above.

A cylinder type steering damper 25 is arranged between the vehicle body frame F and the bridge mounted on the steering shaft 14 above or below the head pipe 11 which is, in this embodiment, the bottom bridge 21 mounted on the steering shaft 14 below the head pipe 11. That is, the cylinder type steering damper 25 is arranged in the opening portion 24 formed in the front fender 23 below the bottom bridge 21. The steering damper 25 is mounted on the bottom bridge 21 in front of a center axis C1 of the steering shaft 14 as viewed in a side view, and is mounted on the vehicle body frame F behind the center axis C1 as viewed in a side view. In this embodiment, the steering damper 25 is mounted on a damper support portion 21a which is integrally formed with a front portion of the bottom bridge 21 in a projecting manner, and is also mounted on a lower portion of the head pipe 11 of the vehicle body frame F.

Figure 4:
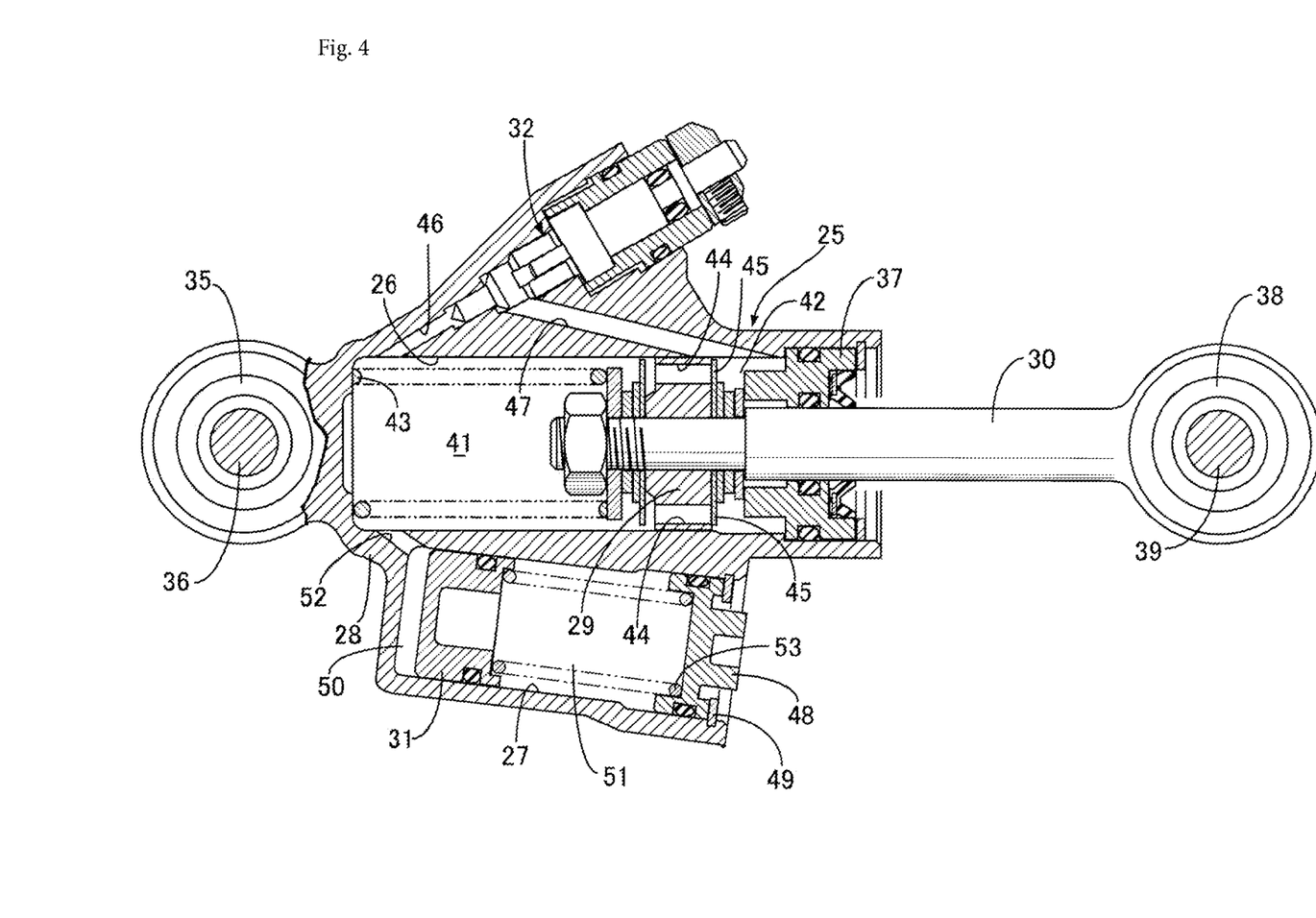
FIG. 4 is a cross-sectional view of a steering damper taken along a line 4-4 in FIG. 3.

As shown in FIG. 4, the steering damper 25 includes: a damper case 28 which has a first bottomed slide hole 26 with a closed front end, and a second slide hole 27 arranged on one side of the first slide hole 26 and having a closed front end; a first piston 29 which is slidably fitted in the first slide hole 26; a damper rod 30 which is coaxial with the first slide hole 26 and has one end portion to which the first piston 29 is fixed; a second piston 31 which is slidably fitted in the second slide hole 27; and an adjuster 32 which is arranged in the damper case 28 at a position where the first slide hole 26 is sandwiched between the adjuster 32 and the second slide hole 27.

The damper case 28 is mounted on either one of the bottom bridge 21 and the vehicle body frame F (the bottom bridge 21 in this embodiment), while the other end portion of the damper rod 30 is mounted on the other of the bottom bridge 21 and the vehicle body frame F (vehicle body frame F in this embodiment). The steering damper 25 is provided between the bottom bridge 21 and the vehicle body frame F such that a length of the steering damper 25 becomes maximum in a non-steering state.

A front portion of the damper case 28 is rotatably mounted on the damper support portion 21a which forms the front portion of the bottom bridge 21 by way of a first spherical bearing 35 and a first bolt 36. A rod guide 37 is fitted in and fixed to a rear end opening portion of the first slide hole 26 in a liquid tight manner, and the damper rod 30 slidably penetrates the rod guide 37 in a liquid tight manner. The other end portion of the damper rod 30 is rotatably mounted on a lower portion of the head pipe 11 of the vehicle body frame F by way of a second spherical bearing 38 and a second bolt 39. A cylindrical collar 40 is interposed between the head pipe 11 and the second spherical bearing 38. Further, in a non-steering state, the first and second bolts 36, 39 are arranged at positions where a straight line L which connects the center of the bolt 36 and the center of the bolt 39 orthogonally intersects with the center axis C1 of the steering shaft 14.

In the inside of the first slide hole 26, a first damper chamber 41 is defined between the damper case 28 and the first piston 29, and a second damper chamber 42 is defined between the first piston 29 and the rod guide 37. A coil spring 43 which biases the first piston 29 toward a side where a volume of the damper chamber 41 is increased is housed in the first damper chamber 41. The coil spring 43 is interposed between the damper case 28 and the first piston 29 such that the coil spring 43 is compressed corresponding to the movement of the first piston 29 in the direction where the volume of the first damper chamber 41 is decreased.

A plurality of communication holes 44 which extend in the axial direction are formed in the first piston 29. A check valve 45 which opens or closes opening ends of these communication holes 44 on a second damper chamber 42 side is mounted on the first piston 29 such that the check valve 45 allows the flow of oil from the first damper chamber 41 to the second damper chamber 42.

A first passage 46 communicated with the first damper chamber 41 and a second passage 47 communicated with the second damper chamber 42 are formed in the damper case 28. The adjuster 32 is arranged in the damper case 28 such that the adjuster 32 throttles the flow of oil which flows into the first passage 46 from the second passage 47, that is, the flow of oil which flows into the first damper chamber 41 from the second damper chamber 42 and, at the same time, the adjuster 32 can adjust the degree of throttling.

A lid member 48 which closes the other-end opening portion of the second slide hole 27 is fitted in the damper case 28. A retainer ring 49 which prevents the removal of the lid member 48 from the second slide hole 27 is fitted on an inner periphery of the other-end opening portion of the second slide hole 27 such that the retainer ring 49 is engaged with the lid member 48 from a side opposite to the second piston 31. A reservoir chamber 50 is defined between the second piston 31 and the damper case 28 in the inside of the second slide hole 27, and the reservoir chamber 50 is communicably connected to the first damper chamber 41 through a third passage 52 formed in the damper case 28. A coil-shaped return spring 53 accommodated in a spring chamber 51 defined between the second piston 31 and the lid member 48 is provided between the second piston 31 and the lid member 48 in a contracted manner such that the return spring 53 biases the second piston 31 toward a side where a volume of the reservoir chamber 50 is decreased.

Figure 5:
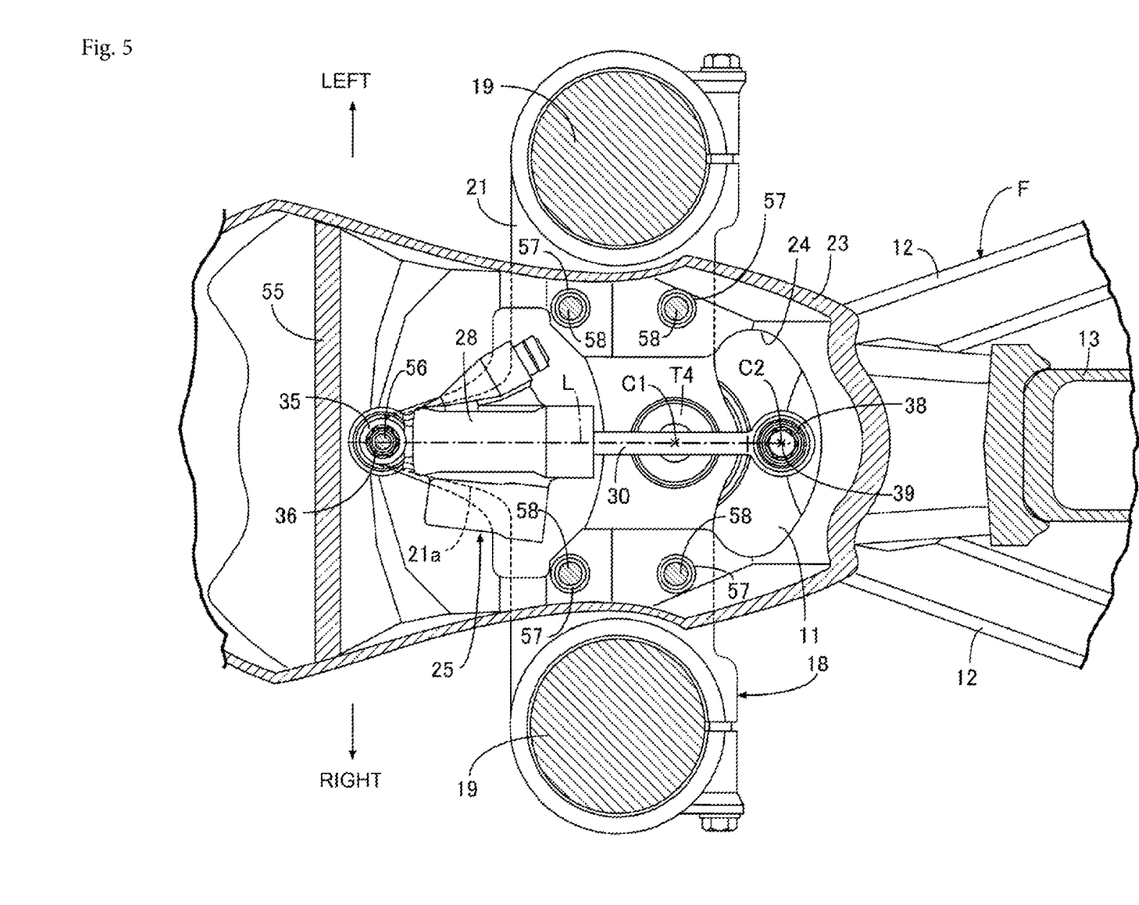
FIG. 5 is a cross-sectional view of the steering damper in a non-steering state taken along a line 5-5 in FIG. 3.
Figure 6:
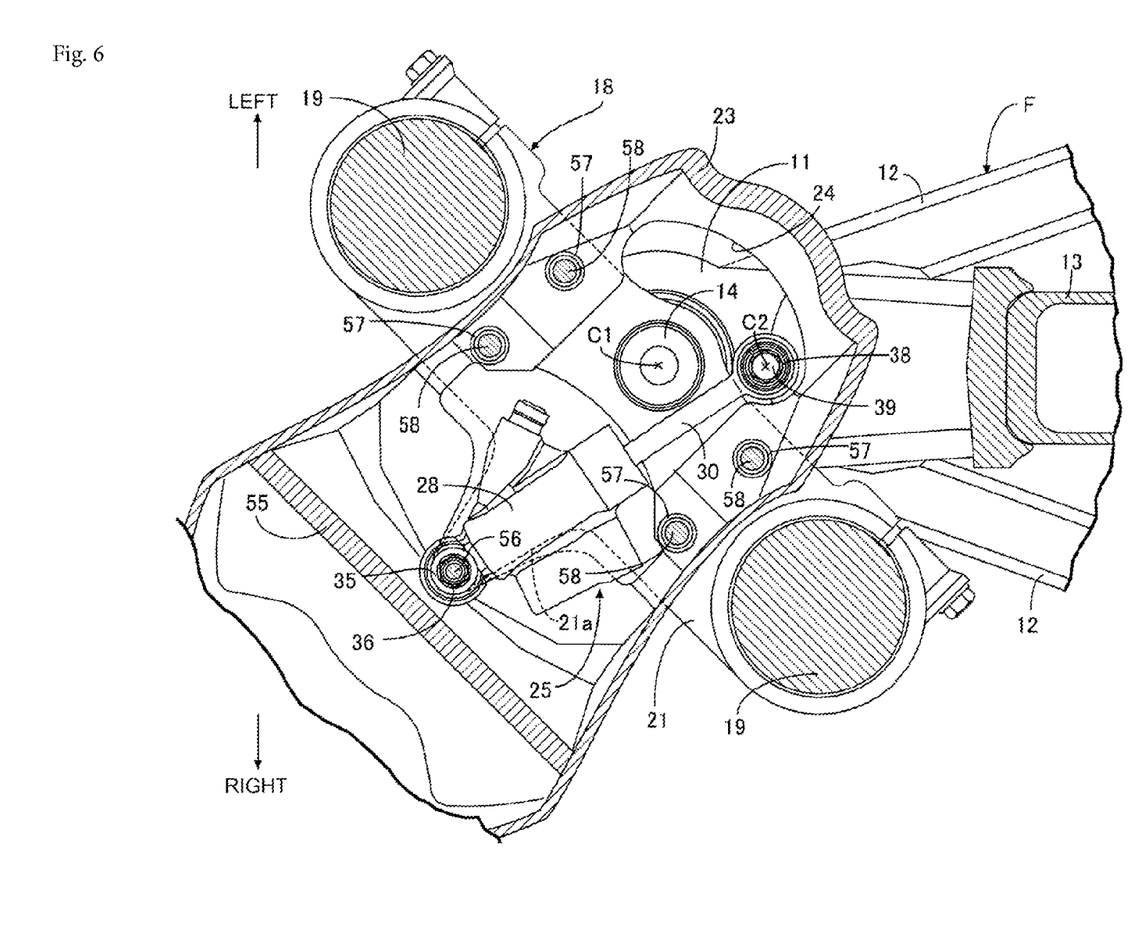
FIG. 6 is a cross-sectional view corresponding to FIG. 5 in a state where the steering is turned to the right.

When the steering damper 25 is in a non-steering state shown in FIG. 5, the first piston 29 takes a position where a volume of the second damper chamber 42 is minimized so that the steering damper 25 is in a most extended state. When the steering is turned to the right as shown in FIG. 6 in such a state, for example, the bottom bridge 21 which constitute a portion of the front fork 18 is rotated about the center axis C1 of the steering shaft 14, and the damper case 28 is also rotated about the center axis of the second bolt 39 corresponding to the rotation of the bottom bridge 21. As a result, the first piston 29 which moves while compressing the coil spring 43 takes a position where a volume of the first damper chamber 41 is decreased so that the steering damper 25 is brought into a contracted state. In such switching of the state of the steering damper 25 from an extended state to a contracted state, oil flows into the second damper chamber 42 from the first damper chamber 41 through the check valve 45 due to the reduction of the volume of the first damper chamber 41. At the same time, surplus oil is produced due to the difference in an amount of change in volume between the first damper chamber 41 and the second damper chamber 42 which is brought about by the movement of the first piston 29, and such surplus oil flows into the reservoir chamber 50 and hence, an attenuation force due to throttling of the flow of the oil is barely generated. The same goes for steering to the left from a non-steering state. That is, at the time of steering, only a slight amount of attenuation force which merely compresses the coil spring 43 is generated in the steering damper 25.

On the other hand, at the time of returning the steering to a neutral position, the steering damper 25 is changed from a contracted state where the first piston 29 minimizes the volume of the first damper chamber 41 to a most extended state where the volume of the second damper chamber 42 is minimized. In this manner, at the time of returning the steering to the neutral position, an attenuation force is generated due to throttling of oil which flows into the first damper chamber 41 from the second damper chamber 42 by the adjuster 32. Accordingly, an attenuation force generated in the steering damper 25 at the time of returning the steering to the neutral position is larger than an attenuation force generated at the time of steering. Further, at the time of returning the steering to the neutral position, a spring force of the coil spring 43 in a compressed state when the steering is turned acts on the first piston 29 and, at the same time, the return spring 53 biases the second piston 31 toward a side where the volume of the reservoir chamber 50 is decreased. Accordingly, a spring force acts on the first piston 29 toward a side where the volume of the second damper chamber 42 is decreased.

A cover 55 which covers the steering damper 25 from below is arranged between the steering damper 25 and the front wheel WF, and the cover 55 is fixed to the bottom bridge 21 side. To fix the cover 55 to the bottom bridge 21 side, a first threaded member 56 which is inserted into the cover 55 at a portion corresponding to the first bolt 36 is threadably engaged with a head portion of the first bolt 36. Cylindrical collars 57 are interposed between the bottom bridge 21 and the cover on both left and right sides of the steering damper 25, and four second threaded members 58 which are inserted into the cover 55 and the collars 57 respectively are threadedly engaged with the bottom bridge 21.

Next, the manner of operation of the first embodiment is explained. The steering shaft 14 is rotatably supported on the head pipe 11 provided to the front end portion of the vehicle body frame F, the bridge 21 is mounted on the steering shaft 14 above or below the head pipe 11, and the steering damper 25 is mounted on the bridge 21 in front of the center axis C1 of the steering shaft 14 as viewed in the side view, and is mounted on the vehicle body frame F behind the center axis C1 as viewed in a side view. Accordingly, the steering damper does not influence the design of the head pipe 11 and the area around the head pipe 11 and hence, the degree of freedom in design can be enhanced whereby space saving can be realized also on a vehicle body frame F side.

The bridge on which the steering damper 25 is mounted in front of the center axis C1 of the steering shaft 14 as viewed in the side view is the bottom bridge 21 mounted on the steering shaft 14 below the head pipe 11, and the steering damper 25 is arranged below the bottom bridge 21. Accordingly, the steering damper 25 can be arranged by effectively making use of a vacant space formed between the bottom bridge 21 and the front wheel WF and hence, the degree of freedom in designing the head pipe 11 and the area around the head pipe 11 can be further enhanced.

The cover 55 which covers the steering damper 25 from below is arranged between the steering damper 25 and the front wheel WF. Accordingly, the steering damper 25 can be protected from mud, water and dust or the like splashed up from the front wheel WF.

In the steering damper 25, an attenuation force generated at the time of steering is set smaller than an attenuation force generated at the time of returning the steering to a neutral position. Accordingly, the feel of steering can be enhanced. Further, the coil spring 43 compressed at the time of steering is accommodated in the steering damper 25 and hence, a spring force of the coil spring 43 is applied to the first piston 29 at the time of returning the steering to a neutral position whereby a load imposed on a rider can be reduced.

The steering damper 25 includes: the damper case 28 including the first and second bottomed slide holes 26, 27 having a closed front end respectively and being mounted on the bottom bridge 21; the first piston 29 defining the damper chamber 41 between the damper case 28 and the first piston 29 and being slidably fitted into the first slide hole 26; the damper rod 30 having one end portion thereof fixed to the first piston 29 and the other end portion thereof mounted on the vehicle body frame F; the second piston 31 defining the reservoir chamber 50 communicated with the first damper chamber 41 between the damper case 28 and the second piston 31 and being slidably fitted into the second slide hole 27; the coil spring 43 accommodated in the first damper chamber 41 such that the coil spring 43 biases the first piston 29 toward the side where the volume of the damper chamber 41 is increased; and the return spring 53 which biases the second piston 31 toward the side where the volume of the reservoir chamber 50 is decreased, and the steering damper 25 is provided between the bottom bridge 21 and the vehicle body frame F such that the first piston 29 is moved toward the side where the volume of the damper chamber 41 is decreased so as to compress the coil spring 43 in a steering state while maximally increasing a length of the steering damper 25 in the non-steering state. Accordingly, the steering damper 25 is operated such that the first piston 29 compresses the coil spring 43 in a steering state, and a spring load of the return spring 53 which biases the second piston 31 toward a side where a volume of the reservoir chamber 50 into which working oil flows from the first damper chamber 41 is decreased is also increased in a steering state and hence, a steering torque can be changed in a progressive manner. Further, when the steering damper returns to a neutral position from a steering position, a spring force of the coil spring 43 and a spring force of the return spring 53 act toward a side where the first piston 29 is returned to a neutral position whereby the steering damper 25 can be returned to the neutral position without giving a feeling of discomfort to a rider.

A second embodiment of the invention is explained by reference to FIG. 7. Parts corresponding to the parts of the above-mentioned first embodiment are only shown with the same symbols, and the detailed explanation of such parts is omitted.

Figure 7:
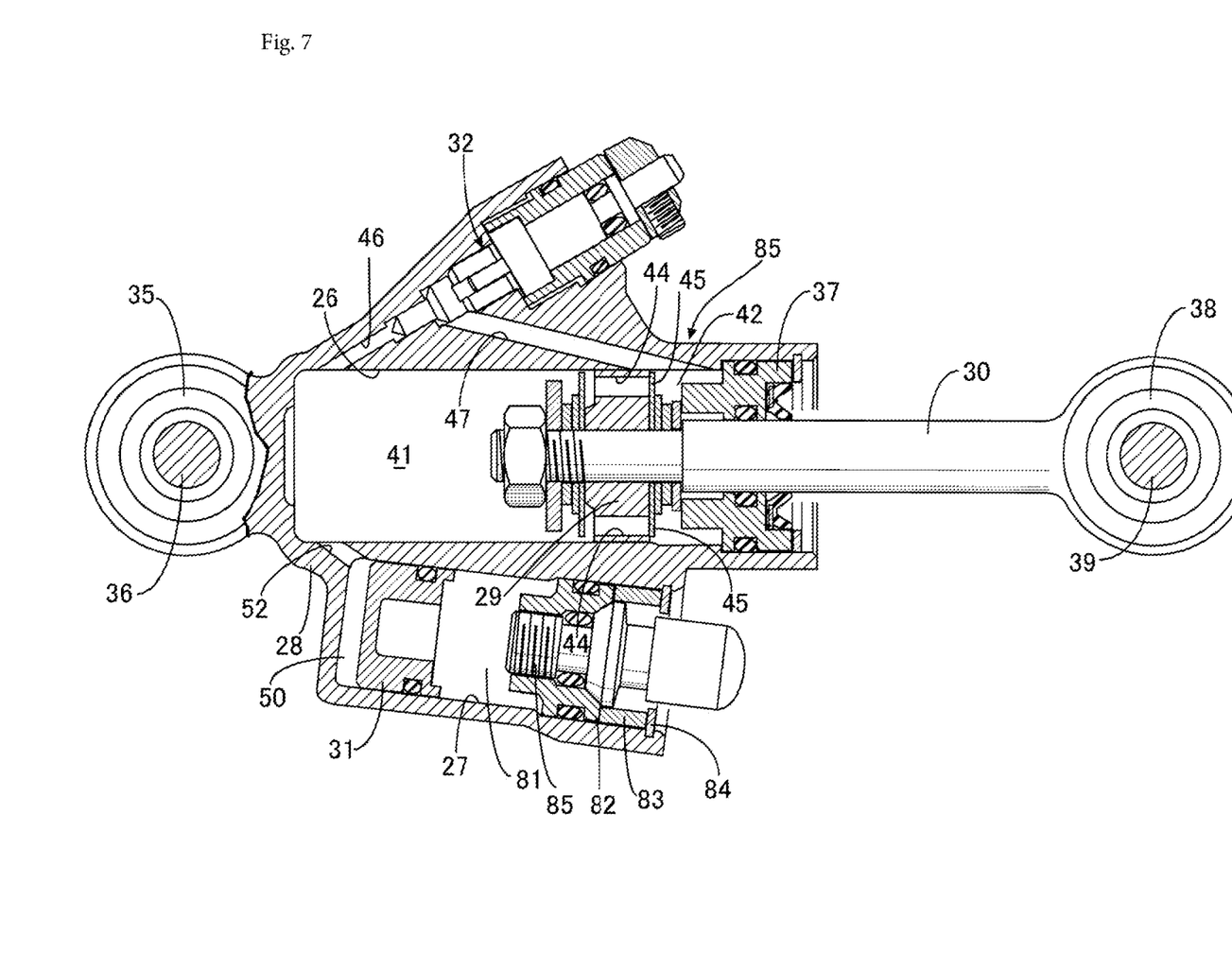
FIG. 7 is a cross-sectional view corresponding to FIG. 4 showing a steering damper of a second embodiment.

A steering damper 85 shown in FIG. 7 may be provided between the bottom bridge 21 (see first embodiment) and the vehicle body frame F (see first embodiment) in place of the steering damper 25 in the above-mentioned first embodiment. The steering damper 85 includes: a damper case 28 including first and second bottomed slide holes 26, 27 with a closed front end; a first piston 29 defining first and second damper chambers 41, 42 between the damper case 28 and the first piston 29 and being slidably fitted into the first slide hole 26; a damper rod 30 having one end portion thereof fixed to the first piston 29; and a second piston 31 slidably fitted in the second slide hole 27 in a state where both ends of the second piston 31 face a reservoir chamber 50 formed in the damper case 28 in a communicating manner with the first damper chamber 41 and a pressurized air chamber 81 formed in the damper case 28 into which pressurized air is supplied. The reservoir chamber 50 is defined in the damper case 28 between a front end closed portion of the second slide hole 27 and the second piston 31.

A valve holder 82 is airtightly fitted in an opening portion of the second slide hole 27 on a rear end side. A cylindrical sleeve 83 which is brought into contact with the valve holder 82 from behind is fitted in the opening portion of the second slide hole 27. A retainer ring 84 which is brought into contact with and is engaged with the sleeve 83 from behind is mounted on an inner periphery of the second slide hole 27. Further, an air valve 85 for supplying pressurized air into the pressurized air chamber 81 is mounted on the valve holder 82, and the pressurized air chamber 81 is defined in the damper case 28 between the valve holder 82 on which the air valve 85 is mounted and the second piston 31.

Differing from the above-mentioned first embodiment, the coil spring 43 is not accommodated in the first damper chamber 41.

The steering damper 85 is provided between the bottom bridge 21 and the vehicle body frame F such that the first piston 29 is moved toward a side where a volume of the first damper chamber 41 is decreased in a steering state while maximally increasing a length of the steering damper 25 in a non-steering state.

According to the second embodiment, in the steering damper 85, a pressure in the pressurized air chamber 81 acts on the second piston 31 toward a side where a volume of the reservoir chamber 50 into which a working oil flows from the first damper chamber 41 is decreased in a steering state. Accordingly, it is possible to impart a steering reaction force to the steering damper 85. It is also possible to change such a reaction force.

Although the embodiments of the invention have been explained heretofore, the invention is not limited to the above-mentioned embodiments and various design modifications are conceivable without departing from the gist of the invention described in Claims.

The invention is not limited to motorcycles, and is broadly applicable to saddle-ride-type vehicles including three-wheeled motorcycles, for example.

I claim:

1. A steering structure of a saddle-ride vehicle, comprising:
   a steering shaft rotatably supported on a head pipe provided to a front end portion of a vehicle body frame;
   a bridge mounted on the steering shaft above or below the head pipe; and
   a cylindrical steering damper provided between the vehicle body frame and the bridge,
   wherein the steering damper is mounted on the bridge in front of a center axis of the steering shaft as viewed in a side view, and is mounted on the vehicle body frame behind the center axis as viewed in a side view, and
   wherein a cover fixed to the bridge, which covers the entire steering damper from below, is arranged between the steering damper and a front wheel.

2. The steering structure of a saddle-ride vehicle according to claim 1, wherein
   the bridge is a bottom bridge mounted on the steering shaft below the head pipe, and the steering damper is arranged below the bottom bridge.

3. The steering structure of a saddle-ride vehicle according to claim 2, wherein
   an attenuation force of the steering damper which is generated at the time of steering is set smaller than the attenuation force generated at the time of returning the steering to a neutral position, and
   a coil spring compressed at the time of steering is housed in the steering damper.

4. The steering structure of a saddle-ride vehicle according to claim 2, wherein
   the steering damper comprises:
   a damper case including first and second bottomed slide holes and being mounted on either one of the bridge and the vehicle body frame;
   a first piston defining a damper chamber between the damper case and the first piston and being slidably fitted into the first slide hole;
   a damper rod having one end portion thereof fixed to the first piston and the other end portion thereof fixed to the other of the bridge and the vehicle body frame;
   a second piston defining a reservoir chamber communicated with the damper chamber between the damper case and the second piston and being slidably fitted into the second slide hole;
   a coil spring housed in the damper chamber such that the coil spring biases the first piston toward a side where a volume of the damper chamber is increased; and
   a return spring which biases the second piston toward a side where a volume of the reservoir chamber is decreased, wherein
   the steering damper is provided between the bridge and the vehicle body frame such that the first piston is moved toward a side where the volume of the damper chamber is decreased so as to compress the coil spring in a steering state while maximally increasing a length of the steering damper in a non-steering state.

5. The steering structure of a saddle-ride vehicle according to claim 2, wherein
   the steering damper comprises:
   a damper case including first and second bottomed slide holes and being mounted on either one of the bridge and the vehicle body frame;
   a first piston defining a damper chamber between the damper case and the first piston and being slidably fitted into the first slide hole;
   a damper rod having one end portion thereof fixed to the first piston and the other end portion thereof fixed to the other of the bridge and the vehicle body frame; and
   a second piston slidably fitted into the second slide hole in a state where both ends of the second piston face a reservoir chamber which is formed in the damper case in a communicating manner with the damper chamber and a pressurized air chamber formed in the damper case into which pressurized air is filled respectively, wherein
   the steering damper is provided between the bridge and the vehicle body frame such that the first piston is moved toward a side where the volume of the damper chamber is decreased in a steering state while maximally increasing a length of the steering damper in a non-steering state.

6. The steering structure of a saddle-ride vehicle according to claim 1, wherein
   an attenuation force of the steering damper which is generated at the time of steering is set smaller than the attenuation force generated at the time of returning the steering to a neutral position, and
   a coil spring compressed at the time of steering is housed in the steering damper.

7. The steering structure of a saddle-ride vehicle according to claim 6, wherein
   the steering damper comprises:
   a damper case including first and second bottomed slide holes and being mounted on either one of the bridge and the vehicle body frame;
   a first piston defining a damper chamber between the damper case and the first piston and being slidably fitted into the first slide hole;
   a damper rod having one end portion thereof fixed to the first piston and the other end portion thereof fixed to the other of the bridge and the vehicle body frame;
   a second piston defining a reservoir chamber communicated with the damper chamber between the damper case and the second piston and being slidably fitted into the second slide hole;
   a coil spring housed in the damper chamber such that the coil spring biases the first piston toward a side where a volume of the damper chamber is increased; and
   a return spring which biases the second piston toward a side where a volume of the reservoir chamber is decreased, wherein the steering damper is provided between the bridge and the vehicle body frame such that the first piston is moved toward a side where the volume of the damper chamber is decreased so as to compress the coil spring in a steering state while maximally increasing a length of the steering damper in a non-steering state.

8. The steering structure of a saddle-ride vehicle according to claim 1, wherein
an attenuation force of the steering damper which is generated at the time of steering is set smaller than the attenuation force generated at the time of returning the steering to a neutral position, and
a coil spring compressed at the time of steering is housed in the steering damper.

9. The steering structure of a saddle-ride vehicle according to claim 1, wherein
the steering damper comprises:
a damper case including first and second bottomed slide holes and being mounted on either one of the bridge and the vehicle body frame;
a first piston defining a damper chamber between the damper case and the first piston and being slidably fitted into the first slide hole;
a damper rod having one end portion thereof fixed to the first piston and the other end portion thereof fixed to the other of the bridge and the vehicle body frame;
a second piston defining a reservoir chamber communicated with the damper chamber between the damper case and the second piston and being slidably fitted into the second slide hole;
a coil spring housed in the damper chamber such that the coil spring biases the first piston toward a side where a volume of the damper chamber is increased; and
a return spring which biases the second piston toward a side where a volume of the reservoir chamber is decreased, wherein
the steering damper is provided between the bridge and the vehicle body frame such that the first piston is moved toward a side where the volume of the damper chamber is decreased so as to compress the coil spring in a steering state while maximally increasing a length of the steering damper in a non-steering state.

10. The steering structure of a saddle-ride vehicle according to claim 1, wherein
the steering damper comprises:
a damper case including first and second bottomed slide holes and being mounted on either one of the bridge and the vehicle body frame;
a first piston defining a damper chamber between the damper case and the first piston and being slidably fitted into the first slide hole;
a damper rod having one end portion thereof fixed to the first piston and the other end portion thereof fixed to the other of the bridge and the vehicle body frame;
a second piston defining a reservoir chamber communicated with the damper chamber between the damper case and the second piston and being slidably fitted into the second slide hole;
a coil spring housed in the damper chamber such that the coil spring biases the first piston toward a side where a volume of the damper chamber is increased; and
a return spring which biases the second piston toward a side where a volume of the reservoir chamber is decreased, wherein
the steering damper is provided between the bridge and the vehicle body frame such that the first piston is moved toward a side where the volume of the damper chamber is decreased so as to compress the coil spring in a steering state while maximally increasing a length of the steering damper in a non-steering state.

11. The steering structure of a saddle-ride vehicle according to claim 1, wherein
the steering damper comprises:
a damper case including first and second bottomed slide holes and being mounted on either one of the bridge and the vehicle body frame;
a first piston defining a damper chamber between the damper case and the first piston and being slidably fitted into the first slide hole;
a damper rod having one end portion thereof fixed to the first piston and the other end portion thereof fixed to the other of the bridge and the vehicle body frame; and
a second piston slidably fitted into the second slide hole in a state where both ends of the second piston face a reservoir chamber which is formed in the damper case in a communicating manner with the damper chamber and a pressurized air chamber formed in the damper case into which pressurized air is filled respectively, wherein
the steering damper is provided between the bridge and the vehicle body frame such that the first piston is moved toward a side where the volume of the damper chamber is decreased in a steering state while maximally increasing a length of the steering damper in a non-steering state.

12. The steering structure of a saddle-ride vehicle according to claim 1, wherein
the steering damper comprises:
a damper case including first and second bottomed slide holes and being mounted on either one of the bridge and the vehicle body frame;
a first piston defining a damper chamber between the damper case and the first piston and being slidably fitted into the first slide hole;
a damper rod having one end portion thereof fixed to the first piston and the other end portion thereof fixed to the other of the bridge and the vehicle body frame; and
a second piston slidably fitted into the second slide hole in a state where both ends of the second piston face a reservoir chamber which is formed in the damper case in a communicating manner with the damper chamber and a pressurized air chamber formed in the damper case into which pressurized air is filled respectively, wherein
the steering damper is provided between the bridge and the vehicle body frame such that the first piston is moved toward a side where the volume of the damper chamber is decreased in a steering state while maximally increasing a length of the steering damper in a non-steering state.

* * * * *